United States Patent
Han et al.

(10) Patent No.: US 11,974,329 B2
(45) Date of Patent: *Apr. 30, 2024

(54) NETWORK ACCESS METHOD AND APPARATUS AND STORAGE MEDIUM

(71) Applicant: ZTE Corporation, Guangdong (CN)

(72) Inventors: Zhiqiang Han, Guangdong (CN); Kaiying Lv, Guangdong (CN); Bo Sun, Guangdong (CN); Chen Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,640

(22) Filed: Mar. 28, 2023

(65) Prior Publication Data

US 2023/0269781 A1    Aug. 24, 2023

Related U.S. Application Data

(63) Continuation of application No. 17/459,759, filed on Aug. 27, 2021, now Pat. No. 11,706,818, which is a continuation of application No. 16/609,083, filed as application No. PCT/CN2018/080735 on Mar. 27, 2018, now Pat. No. 11,109,419.

(30) Foreign Application Priority Data

Apr. 28, 2017   (CN) .......................... 201710296171.7

(51) Int. Cl.
*H04W 74/0833*   (2024.01)
*H04W 74/00*    (2009.01)

(52) U.S. Cl.
CPC ..... *H04W 74/0833* (2013.01); *H04W 74/008* (2013.01)

(58) Field of Classification Search
None
See application file for complete search history.

(56) References Cited

U.S. PATENT DOCUMENTS

| | | | |
|---|---|---|---|
| 9,998,263 B2 | 6/2018 | Li et al. | |
| 10,028,142 B2 | 7/2018 | Kwon | |
| 10,348,471 B2 * | 7/2019 | Noh | ...... H04L 5/0094 |

(Continued)

FOREIGN PATENT DOCUMENTS

| | | |
|---|---|---|
| CN | 105517118 A | 4/2016 |
| CN | 106341898 A | 1/2017 |

(Continued)

OTHER PUBLICATIONS

International Search Report for corresponding application PCT/CN2018/080735 filed Mar. 27, 2018; Mail date Jun. 19, 2018.

(Continued)

*Primary Examiner* — Jamaal Henson
(74) *Attorney, Agent, or Firm* — Perkins Coie LLP (57) ABSTRACT

Disclosed is a network access method, including that a station receives a first radio frame from a first access point, where the first radio frame indicates a resource unit for a random-access operation; and when the sending address of the first radio frame is a public identity or a private identity, the station performs the random-access operation. Also disclosed are a network access apparatus and a storage medium.

20 Claims, 3 Drawing Sheets

(56) References Cited

U.S. PATENT DOCUMENTS

| | | | |
|---|---|---|---|
| 10,462,816 | B2 | 10/2019 | Patil et al. |
| 10,536,979 | B2 | 1/2020 | Ko et al. |
| 10,728,846 | B2 | 7/2020 | Choi et al. |
| 11,438,889 | B2 | 9/2022 | Nezou et al. |
| 2007/0047583 | A1 | 3/2007 | Assa et al. |
| 2008/0112373 | A1 | 5/2008 | Shpak |
| 2011/0013569 | A1 | 1/2011 | Scherzer et al. |
| 2016/0100408 | A1 | 4/2016 | Hedayat |
| 2016/0227579 | A1 | 8/2016 | Stacey et al. |
| 2016/0381709 | A1 | 12/2016 | Ghosh et al. |
| 2017/0048882 | A1 | 2/2017 | Li et al. |
| 2017/0245306 | A1* | 8/2017 | Kim .................. H04W 72/21 |
| 2018/0152881 | A1 | 5/2018 | Tipton et al. |
| 2018/0199271 | A1 | 7/2018 | Viger et al. |
| 2018/0199375 | A1* | 7/2018 | Nezou ............... H04W 74/006 |
| 2018/0235014 | A1 | 8/2018 | Li et al. |

FOREIGN PATENT DOCUMENTS

| | | | |
|---|---|---|---|
| CN | 106465040 | A | 2/2017 |
| CN | 106550479 | A | 3/2017 |
| CN | 110115093 | A | 8/2019 |
| CN | 110521250 | A | 11/2019 |
| CN | 110547026 | A | 12/2019 |
| EP | 3565365 | A1 | 11/2019 |
| GB | 2560589 | A * | 9/2018 .......... H04W 72/121 |
| WO | 2017007180 | A1 | 1/2017 |
| WO | 2017045521 | A1 | 3/2017 |
| WO | 2018193128 | A1 | 10/2018 |
| WO | 2018194895 | A1 | 10/2018 |

OTHER PUBLICATIONS

Kaiying Lv, TA Address Field in Trigger Frame, IEEE 802.11-15/1389r0, IEEE mentor, Nov. 9, 2015, 17 pages.

Chittabrata Ghosh, UL OFDMA-based Random Access Procedure, IEEE 802.11-15/1105r0, IEEE mentor, Sep. 13, 2015, 20 pages.

Liwen Chu (Marvell), Multiple BSSID and MU Discussion, IEEE 802.11-16/1454r0, IEEE mentor, Nov. 8, 2016, 11 pages.

Supplementary European Search Report in EP Patent Application No. 18791309, dated Nov. 12, 2020, 2 pages.

Qiao, D. et al., "Discussion on CR for CID 5066," IEEE 802.11-17/0104r1, Huawei Technologies, Jan. 2017.

Office Action for Japanese Patent Application No. 2019-558593, mailed Jun. 17, 2021, with English summary (4 pages).

Ghosh, "Resolution for CIDs on UL OFDMA-based Random Access," IEEE 802.11-16/1222r0, IEEE mentor, Sep. 12, 2016, 14 pages.

Merlin, "Comment Resolutions on UL MU Operation," IEEE 802.11-16/0929r3, IEEE mentor, Sep. 14, 2016, 28 pages.

Chinese Notification to Complete Formalities of Registration issued in CN Patent Application No. 201710296171.7, dated Apr. 9, 2023, 4 pages. English translation included.

European Communication pursuant to Article 94(3) EPC issued in EP Patent Application No. 18791309.0, dated Dec. 6, 2023, 5 pages.

Japanese office action issued in JP Patent Application No. 2023-041818, dated Dec. 26, 2023, 4 pages. English translation included.

Nezou et al., "Issues related to OCW management," IEEE 802.11-16/0591r0, IEEE mentor, May 16, 2016, 13 pages.

Khorov et al., "Considerations on Trigger Frame for Random Access Procedure," IEEE 802.11-16/0399r0, IEEE mentor, Mar. 13, 2016, 12 pages.

Patil et al., "Proposed resolution for comments related to Random Access AIDs for Associated and Unassociated STAs," IEEE 802.11-17/0229r0, IEEE mentor, Mar. 9, 2017, 15 pages.

* cited by examiner

NETWORK ACCESS METHOD AND APPARATUS AND STORAGE MEDIUM

CROSS REFERENCE TO RELATED APPLICATION

This application is a continuation of U.S. patent application Ser. No. 17/459,759, filed on Aug. 27, 2021, which is a continuation of U.S. patent application Ser. No. 16/609,083, filed on Oct. 28, 2019, issued as U.S. Pat. No. 11,109,419, with a grant date of Aug. 31, 2021, which is a National stage application, filed under 37 U.S.C. 371, of the International Patent Application No. PCT/CN2018/080735, filed on Mar. 27, 2018, which is based on and claims priority to Chinese Patent Application No. 201710296171.7, filed on Apr. 28, 2017. The disclosures of each of which are incorporated herein by reference in their entireties.

TECHNICAL FIELD

The embodiments of the present application relate to, but are not limited to, the field of the communication technologies and, in particular, to a network access method and apparatus and a storage medium.

BACKGROUND

With the explosive application of wireless local area networks (WLAN), the deployment of WLAN is becoming more intensive, the network load is becoming heavier, and the overlapping of network coverage is becoming more serious with the increase of the number of networks. The efficiency of the WLAN tends to decrease significantly, and it is feasible to solve the problem simply through the increase of the air interface rate.

The multiple-user transmission technology can significantly improve the efficiency of the WLAN. The technology includes the uplink and downlink orthogonal frequency division multiple access (OFDMA) technology, the uplink and downlink multiple-user multiple-input and multiple-output (MIMO) technology, or a combination thereof. In the uplink OFDMA technology, an access point (AP) may send a Trigger frame to schedule one or more resource units (RU) for the random access of an associated station or an unassociated station (STA). One or more resource units for the random access are indicated for the associated station or the unassociated station by using a particular indication in the Trigger frame. The STA performs the transmission before the association by using the resource units for the random access of the associated station or the unassociated station indicated in the Trigger frame sent by the AP. The associated station or the unassociated station needs to determine whether to perform transmission according to the backoff mechanism and carrier sense (CS) of the resource units for the random access of the associated station indicated in the Trigger frame.

In the WLAN, an AP and a plurality of non-AP STAs, with which the AP intends to associate, form a basic service set (BSS). Generally, one AP starts one BSS, and the identity of the BSS (BSSID) is the media access control (MAC) address of the AP. One AP is allowed to virtualize (or configure) a plurality of BSSs in the WLAN. The plurality of BSSs actually correspond to one entity AP. The AP explicitly or implicitly broadcasts parameters of these BSSs in a beacon frame, where the parameters of these BSSs include BSSIDs, SSIDs, etc. These BSSs form a set of basic service sets.

In a scenario of multiple-user parallel transmission, the AP triggers the stations under its own BSS set to perform uplink multiple-user transmission. However, in this case, how to use the Trigger frame to trigger the random-access process is an urgent problem to be solved.

SUMMARY

A network access method and apparatus are provided to reduce the network collision and improve the transmission efficiency.

The network access method includes the steps described below.

A station receives the first radio frame from the first access point. The first radio frame indicates a resource unit for a random-access operation.

When the sending address of the first radio frame is a public identity or a private identity, the station performs the random-access operation.

Optionally, before the step in which the station receives the first radio frame, the method further includes the step described below.

The second radio frame sent by the first access point is received. The second radio frame carries a random-access parameter supported by the first access point and/or information about a set of basic service sets supported by the first access point. The information about the set of basic service sets includes the public identity and the private identity.

Optionally, after the step in which the station receives the second radio frame sent by the first access point, the method further includes the steps described below.

A contention-window parameter is set according to the random-access parameter carried by the second radio frame, and an orthogonal frequency division multiple access back-off (OBO) counter is initialized.

Optionally, when the station is an unassociated station, the private identity is the identity of a basic service set, with which the station is to communicate, in the set of basic service sets.

When the station is an unassociated station, the public identity is the identity of a basic service set, with which all stations are able to communicate, in the set of basic service sets.

Optionally, the public identity includes: a transmitted basic-service-set identity of the set of basic service sets, or a media access control address of the first access point, or a value calculated from the media access control address of the first access point.

Optionally, the private identity is the identity of a basic service set, with which the station is associated, in the set of basic service sets.

The public identity is the identity of a basic service set, with which all stations are able to communicate, in the set of basic service sets.

Optionally, the step in which the station performs the random access operation with the first access point includes the steps described below.

The station decrements the orthogonal frequency division multiple access backoff (OBO) counter according to the number of resource units carried by the first radio frame. When the OBO counter is decremented to 0 and the detection condition is met, the station selects, from the resource units carried by the first radio frame, one resource unit to send data.

Optionally, when the station is an unassociated station, the station performs the random-access operation only with the first access point in the process of performing the random-access operation, until the random-access operation is completed.

Optionally, the process in which the station performs the random access operation with the first access point includes the steps described below.

The station receives the third radio frame from the second access point, resets the contention-window parameter according to the random-access parameter notified by the second access point, reinitializes the orthogonal frequency division multiple access backoff (OBO) counter, and performs the random-access operation according to the parameter carried by the third radio frame.

A network access apparatus includes a reception module and an access module.

The reception module is configured to receive the first radio frame from the first access point. The first radio frame indicates a resource unit for a random-access operation.

The access module is configured to perform the random-access operation when the sending address of the first radio frame is a public identity or a private identity.

Optionally, the reception module is further configured to receive the second radio frame sent by the first access point. The second radio frame carries a random-access parameter and/or information about a set of basic service sets supported by the first access point. The information about the set of basic service sets includes the public identity and the private identity.

Optionally, the apparatus further includes an initialization module.

The initialization module is configured to set a contention-window parameter according to the random-access parameter carried by the second radio frame, and initialize an orthogonal frequency division multiple access backoff (OBO) counter.

Optionally, when the apparatus is an unassociated station, the private identity is the identity of a basic service set, with which the apparatus is to communicate, in the set of basic service sets; or when the apparatus is an unassociated station, the public identity is the identity of a basic service set, with which all stations are able to communicate, in the set of basic service sets.

Optionally, the public identity includes: a transmitted basic-service-set identity of the set of basic service sets, or the media access control address of the first access point, or a value calculated from the media access control address of the first access point.

Optionally, the private identity is the identity of a basic service set, with which the station is associated, in the set of basic service sets; or the public identity is an identity of a basic service set, with which all stations are able to communicate, in the set of basic service sets.

Optionally, the access module is configured to perform the random-access operation with the first access point by decrementing the orthogonal frequency division multiple access backoff (OBO) counter according to the number of resource units carried by the first radio frame; and when the OBO counter is decremented to 0 and a detection condition is met, selecting one resource unit, from the resource units carried by the first radio frame, to send data.

Optionally, when the apparatus is an unassociated station, the access module is configured to perform the random-access operation only with the first access point in the process of performing the random-access operation, until the random-access operation is completed.

Optionally, the apparatus further includes an initialization module.

The initialization module is configured to receive the third radio frame from the second access point, resets the contention-window parameter according to the random-access parameter notified by the second access point, and reinitializes the orthogonal frequency division multiple access backoff (OBO) counter.

The access module is further configured to perform the random-access operation according to a parameter carried by the third radio frame.

A network access apparatus includes a memory and a processor.

The memory stores the following instructions: receiving the first radio frame from the first access point, where the first radio frame indicates a resource unit for a random-access operation; and when the sending address of the first radio frame is a public identity or a private identity, performing the random-access operation.

The processor is configured to execute the instructions stored in the memory.

A storage medium stores computer-executable instructions. When the computer-executable instructions are executed, the network access method of any one of the foregoing solutions is performed.

In summary, the present application provides a network access method and apparatus, which can reduce the network collision and improve the transmission efficiency.

DETAILED DESCRIPTION

The object, technical solution and advantages of the present application will be clearer from a detailed description of embodiments of the present application in conjunction with the drawings. It is to be noted that if not in collision, the embodiments and features therein in the present application may be combined with each other.

Embodiment One

Figure 1:
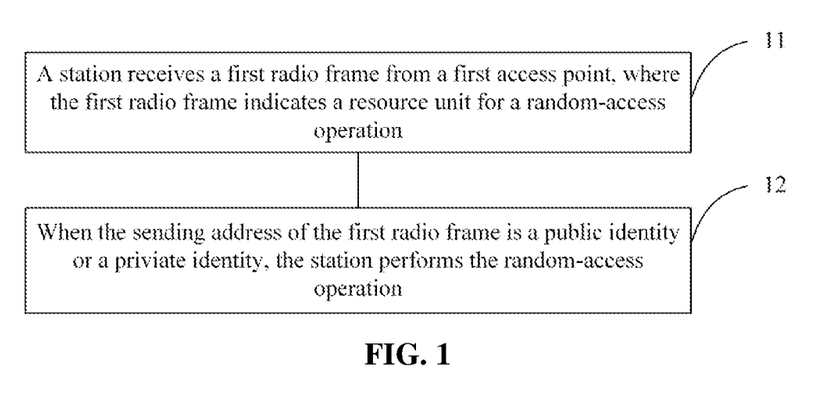
FIG. 1 is a flowchart of a network access method according to an embodiment of the present application.

FIG. 1 is a flowchart of a network access method according to an embodiment of the present application. As shown in FIG. 1, the method includes the steps described below.

In step 11, a station receives a first radio frame from a first access point, where the first radio frame indicates a resource unit for a random-access operation.

In step 12, when the sending address of the first radio frame is a public identity or a private identity, the station performs the random-access operation.

According to the method in the embodiment of the present application, the operation modes of the associated station and the unassociated station in the case of Multiple BSSID are specified, so that the stations can reasonably the use the resource unit to perform random-access operations, the problem of collision aggravation when unassociated stations perform random-access operations is solved, and the network performance is improved.

In an embodiment, before the step in which the station receives the first radio frame, the method further includes the steps described below.

The second radio frame sent by the first access point is received. The second radio frame carries information about the set of basic service sets supported by the access point and/or a random-access parameter supported by the first access point. The information about the set of basic service sets includes the public identity and the private identity.

In an embodiment, the public identity is the identity of a basic service set, with which all stations are able to communicate, in the set of basic service sets; and the private identity is the identity of a basic service set, with which the station is associated, in the set of basic service sets.

In an embodiment, the public identity includes: the transmitted basic-service-set identity of the set of basic service sets, the media access control address of the first access point, or a value calculated through the media access control address of the first access point.

In an embodiment, after the step in which the station receives the second radio frame sent by the first access point, the method further includes the steps described below.

A contention-window parameter is set according to the random-access parameter carried by the second radio frame, and an orthogonal frequency division multiple access backoff (OBO) counter is initialized.

In an embodiment, when the station is an unassociated station, the public identity is the identity of a basic service set, with which all stations are able to communicate, in the set of basic service sets.

When the station is an unassociated station, the private identity is the identity of a basic service set, with which the station is to communicate, in the set of basic service sets.

When the station is an unassociated station, the station performs the random-access operation only with the first access point in the process of performing the random-access operation, until the random-access operation is completed.

In an embodiment, the step in which the station performs the random-access operation includes the steps described below.

The station decrements the orthogonal frequency division multiple access backoff (OBO) counter according to the number of resource units carried by the first radio frame. When the OBO counter is decremented to 0 and a detection condition is met, the station selects, from the resource units carried by the first radio frame, one resource unit to send data.

In an embodiment, the process in which the station performs the random-access operation includes the steps described below.

The station receives the third radio frame from the second access point; resets the contention-window parameter according to the random-access parameter notified by the second access point; reinitializes the orthogonal frequency division multiple access backoff (OBO) counter; and performs the random-access operation according to parameter carried by the third radio frame.

The technical solution according to the present application will be described in detail below with specific examples.

Embodiment Two

An AP broadcasts that it has capabilities to support Multiple BSSID in a beacon frame or probe response frame, and a set of the parameters of the supported BSSIDs is carried in the beacon frame or the probe response frame.

The number of BSSIDs supported by the AP is at most $2^n$, and n is a positive integer greater than or equal to 0. In this embodiment, the case where n=3 is taken as an example, and the AP can support at most 8 BSSIDs. Actually, the AP uses three of the BSSIDs to establish three BSSs (BSS 1, BSS 2, BSS 3), respectively. The three BSSs form a set of basic service sets. The AP is to broadcast information, such as BSSIDs and SSIDs corresponding to the three BSSs, in the beacon frame or the probe response frame, and also notifies the foregoing value of n. The BSSID indicated by the sending address in the beacon frame or probe response frame carrying the foregoing information is called a transmitted BSSID, that is, the identity of the transmitted basic service set in this set of basic service sets. Other BSSIDs are called non-transmitted BSSIDs.

After receiving the beacon frame or the probe response frame, the station associated with the AP acquires the parameter of the Multiple BSSID set supported by the AP. The parameter includes a public identity and a private identity. These frames further include random-access parameters. The station sets a contention window according to these parameters, and then initializes an orthogonal frequency division multiple access (OFDMA) backoff (OBO) counter. The initialization operation is to assign a random integer from 0 to the contention-window value to the OBO counter.

The AP sends a Trigger frame. The Trigger frame indicates one or more resource units for the random access of the associated station. The associated stations which the AP intends to trigger are in BSS 1 (corresponding to BSSID 1), BSS 2 (corresponding to BSSID 2) and BSS 3 (corresponding to BSSID 3), respectively. The sending address of the Trigger frame is set as the public identity. The public identity here is BSSID 1.

After receiving the Trigger frame, each of the foregoing stations determines that this frame is the Trigger frame, and the sending address is the public identity of the AP, that is, the transmitted BSSID, where the AP is associated with the each of the foregoing stations. Then these stations perform the random-access process according to the resource units scheduled by the Trigger frame and used for the associated station.

The AP sends a Trigger frame. One or more resource units used for the random access of the associated station are indicated in the Trigger frame. The associated station which the AP intends to trigger is in BSS 2. Then the sending address is set as BSSID 2 corresponding to BSS 2. After receiving the Trigger frame, the stations associated with BSS 1 and BSS 3 determine that this frame is the Trigger frame, and the BSSID carried by the sending address of the Trigger frame is not the BSSID (private identity) of the BSS associated with the stations, or the BSSID carried by the sending address of the Trigger is not the public identity of the AP associated with themselves. Then these stations cannot perform the random access according to the one or more resource units indicated in the Trigger frame.

After receiving the Trigger frame, the stations associated with BSS 2 determines that this frame is the Trigger frame, and the BSSID carried by the sending address of the Trigger frame is the BSSID (private identity) associated with the station associated with the BSS 2. Then the stations can perform the random access according to the one or more resource units indicated in the Trigger frame.

Figure 2:
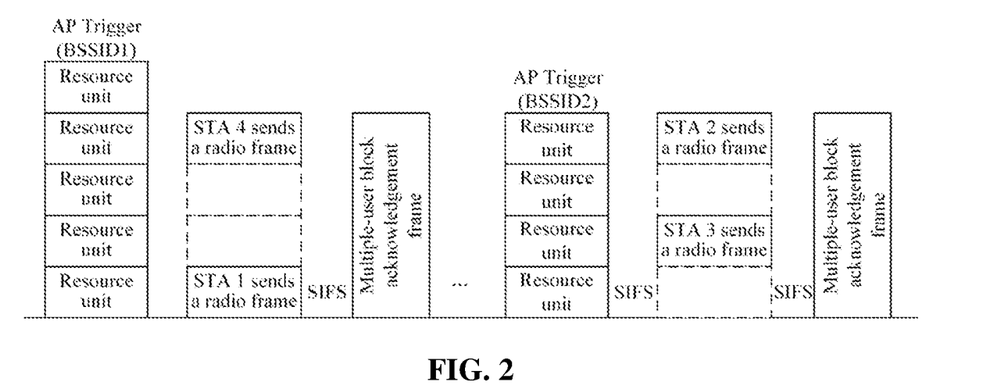
FIG. 2 is a schematic diagram of a random-access operation of an associated station in the case of Multiple BSSID according to an embodiment of the present application.

STA 1 is associated with BSS 1, STA 2 and STA 3 are associated with BSS 2, and STA 4 is associated with BSS 3. As shown in FIG. 2, the AP sends a Trigger frame, the sending address carries the public identity, and 5 resource units are scheduled for the random access.

After receiving the Trigger frame, STA 1 determines that the address carried by the Trigger frame is the public identity of the associated AP, and STA 1 can perform random-access operation. The current OBO-counter value is 3, which is less than the number of resource units for the random access scheduled by the Trigger frame, and then the OBO counter of STA 1 is decremented to 0. In this case, STA 1 randomly selects one resource unit from the currently scheduled 5 random-access resource units to send data if other conditions are met.

After receiving the Trigger frame, STA 2 and STA 3 determine that the address carried by the Trigger frame is the public identity of the associated AP, and STA 2 and STA 3 can perform random-access operation. The current OBO-counter values are 7 and 6, respectively, which are greater than the number of resource units for the random access scheduled by the Trigger frame, and then the OBO-counter values of STA 2 and STA 3 are decremented to 2 and 1, respectively. Since the OBO-counter values are not decremented to 0, STA 2 and STA 3 cannot perform the random access by using the resource units scheduled by the Trigger frame.

After receiving the Trigger frame, STA 4 determines that the address carried by the Trigger frame is the public identity of the associated AP, and STA 4 can perform random-access operation. The current OBO-counter value is 5, which is equal to the number of resource units for the random access scheduled by the Trigger frame, and then the OBO counter of STA 4 is decremented to 0. In this case, STA 4 randomly selects, from the 5 random-access resource units scheduled currently, one resource unit to send data if other conditions are met.

The AP sends a Trigger frame, the sending address carries BSSID 2, and 4 resource units are scheduled for the random access.

STA 1 and STA 4 receive the Trigger frame, and determine that the address carried by the Trigger frame is neither the public identity of the associated AP nor any one of the identity of the BSS associated with STA 1 and the identity of the BSS associated with STA 4, and these stations cannot perform the random access by using the resource units scheduled by the Trigger frame.

STA 2 and STA 3 receive the Trigger frame, and determine that the address carried by the Trigger frame is the address of the BSS associated with STA 2 and STA 3 (that is, private identity), and STA 2 and STA 3 can perform the random-access operation. The current OBO-counter values of STA 2 and STA 3 are 2 and 1, respectively, which are lower than the number of resource units for the random access scheduled by the Trigger frame. Then the OBO-counter values of STA 2 and STA 3 are decremented to 0. In this case, STA 2 and STA 3 each randomly selects, from the 4 random-access currently scheduled resource units, one resource unit to send data if other conditions are met.

STA 1, STA 2, STA 3 and STA 4 receive Trigger frames from other APs. Each of the Trigger frame includes the random-access resource unit for the associated station, however, STA 1 cannot perform the random-access operation because the address carried by the sending address in the Trigger frame is neither the public identity of the associated AP nor the private identity of the BSS with which STA 1 associates.

Embodiment Three

An AP has the capabilities to support Multiple BSSID. The number of BSSIDs supported by the AP is at most $2^n$, and n is a positive integer greater than or equal to 0. In this embodiment, the case where n=3 is taken as an example, and the AP can support at most 8 BSSIDs. Actually, the AP uses three of the BSSIDs to establish three BSSs (BSS 1, BSS 2 and BSS 3), respectively. The three BSSs form a basic service set. The AP is to broadcast information, such as BSSIDs and SSIDs corresponding to the three BSSs, in the beacon frame or the probe response frame, and also notifies the foregoing value of n. The BSSID indicated by the sending address in the beacon frame or probe response frame carrying the foregoing information is called a transmitted BSSID. Other BSSIDs are called non-transmitted BSSIDs. Herein, the public identity is the transmitted BSSID.

The AP sends a Trigger frame. The Trigger frame indicates one or more resource units for the random access of the unassociated station. In the Trigger frame from the AP, the sending address of the Trigger frame is set as the public identity of the AP (the public identity here is the transmitted BSSID) to trigger the random access of the stations that intends to associate with BSS 1, BSS 2 and BSS 3, respectively.

Within the coverage area of the AP, STA 1 finds, through active scanning (receiving the probe request frame) or passive scanning (receiving the beacon frame), that the BSS corresponding to BSSID 2 of the AP is the BSS with which STA1 intends to associate. STA 1 also finds that the AP has the capabilities to support Multiple BSSID, the public identity of the AP is BSSID 1, and the BSSID 2 of BSS 2 with which the AP intends to associate is a private identity.

After receiving the Trigger frame sent by the AP, STA 1 determines, according to the sending address of the Trigger frame, that the address carried by the sending address is BSSID 1. Then STA 1 determines that the BSSID is the same as the public identity of the AP with which STA 1 intends to associate; and then STA 1 can perform the random access according to the one or more resource units indicated in the Trigger frame and used for the unassociated station.

The AP sends a Trigger frame. The Trigger frame indicates one or more resource units for the random access of unassociated station. In the Trigger frame from the AP, the sending address of the Trigger frame is set as the BSSID of BSS 2 (that is, BSSID 2) to trigger the random access of the station that intends to associate with BSS 2.

After receiving the Trigger frame sent by the AP, STA 1 determines, according to the sending address of the Trigger frame, that the address carried by the sending address is BSSID 2; and then STA 1 determines that the BSSID is the same as the BSSID (private identity) of the BSS with which STA 1 intends to associate. In this case, STA 1 can perform the random access according to the one or more resource units indicated in the Trigger frame and used for the unassociated station.

The AP sends a Trigger frame. The Trigger frame indicates one or more resource units for the random access of the unassociated station. In the Trigger frame from the AP, the sending address of the Trigger frame is set as the BSSID of BSS 3 (that is, BSSID 3) to trigger the random access of the station that intends to associate with BSS 3.

After receiving the Trigger frame sent by the AP, STA 1 determines, according to the sending address of the Trigger frame, that the address carried by the sending address is BSSID 3; and then STA 1 determines that the BSSID is different from the public identity of the AP with which STA 1 intends to associate, and the BSSID (private identity) of the BSS with which STA 1 intends to associate. In this case, STA 1 cannot perform the random access according to the one or more resource units indicated in the Trigger frame and used for the unassociated station.

Before performing the foregoing operations, STA 1 learns about, through active scanning or passive scanning, the random access parameter supported by the AP, sets the orthogonal frequency division multiple access (OFDMA) contention window according to the random-access parameter supported by the AP, and initializes the OBO counter.

For example, STA 1 sets the orthogonal frequency division multiple access contention window according to the random access parameter of the foregoing AP, and initializes the OBO counter to 5.

Figure 3:
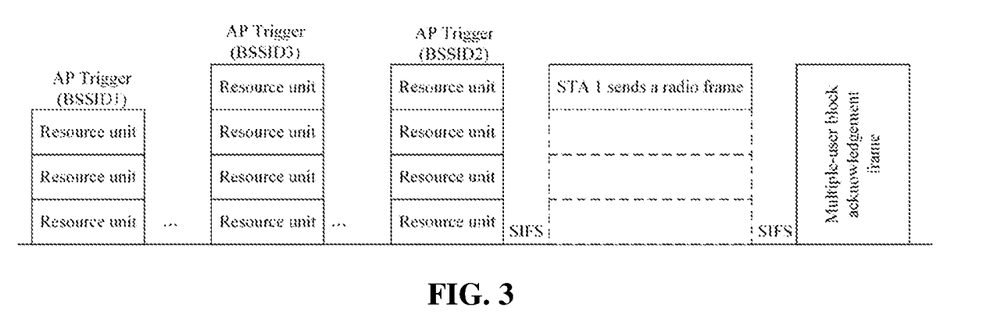
FIG. 3 is a schematic diagram of a random-access operation of an unassociated station in the case of Multiple BSSID according to an embodiment of the present application.

As shown in FIG. 3, the AP sends a Trigger frame, sets the sending address of the Trigger frame as the public identity (the public identity here is the transmitted BSSID), and indicates, in the Trigger frame, 3 resource units for the random access of the unassociated station.

After receiving the Trigger frame, STA1 finds that the sending address of the Trigger frame is set as the public identity of the AP with which STA1 intends to associate, or the sending address of the Trigger frame is the same as one of the public identity and the private identity of the AP with which STA1 intends to associate; and then STA1 performs the random-access operation according to the resource units indicated by the Trigger frame and used for the random access of the unassociated station.

STA1 finds that 3 resource units are carried in the Trigger frame, and then the OBO counter of STA1 is set to 2 (the current value 5 minus the number 3 of resource units for the random access of the unassociated station). The OBO counter may be decremented by 1 as each resource unit for the random access of the unassociated station is found; or after the total number of resource units for the random access of the unassociated station is found, the OBO counter may be decremented by the total number at once. Which specific operation is to be adopted not limited.

The AP sends a Trigger frame, sets the sending address of the Trigger frame to BBSID 3, and indicates, in the Trigger frame, 3 resource units for the random access of the unassociated station.

After receiving the Trigger frame, STA 1 finds that the address carried by the sending address of the Trigger frame is different from the public identity and private identity of the AP with which STA 1 intends to associate; and then STA 1 cannot perform the random-access operation.

The AP sends a Trigger frame, sets the sending address of the Trigger frame as BBSID 2, and indicates, in the Trigger frame, 4 resource units for the random-access operation of the unassociated station.

After receiving the Trigger frame, STA 1 finds that the address carried by the sending address of the Trigger frame is the same as the private identity of the AP with which STA 1 intends to associate; and then STA 1 performs the random-access operation.

STA 1 finds that four resource units are carried in the Trigger frame; and since the number of the resource units carried in the Trigger frame are greater than the OBO-counter value, and then the OBO counter of STA 1 is set to 0. In this case, STA 1 randomly selects one resource unit from the 4 random-access resource units scheduled currently to send radio frames if other conditions are met.

In the process of performing the random-access operation with the AP, STA 1 may receive Trigger frames from other APs. Each Trigger frame includes the indication about resource units for the random operation of the unassociated station. STA 1 cannot perform the random-access operation with any one of these APs unless setting the contention window according to the random-access parameter of the corresponding AP, and reinitializing the OBO counter, in which case, STA 1 can perform the random-access operation with the corresponding AP.

Embodiment Four

Figure 4:
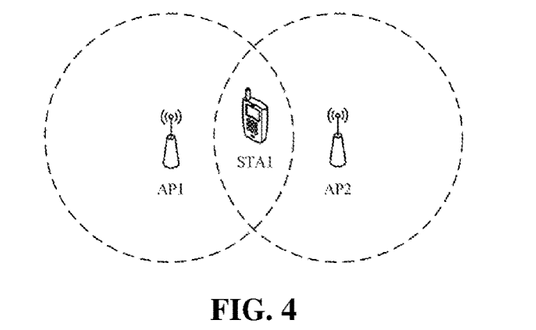
FIG. 4 is a schematic diagram illustrating the case of two access points existing around an unassociated station according to an embodiment of the present application.

FIG. 4 is a schematic diagram illustrating the case of two access points (AP 1 and AP 2) existing around an unassociated station according to an embodiment of the present application. STA 1 intends to communicate with the two access points before association to, for example, learn about services (print, video download, etc.) supported by each access point, STA 1 positioning, association, etc. Herein, both the two APs do not support Multiple BSSID.

STA 1 finds from a beacon frame or a probe response frame sent by AP 1 or AP 2 that AP 1 and AP 2 do not support Multiple BSSID. At this time, the public identities of both APs are null, and the proprietary identities are the MAC address of the AP.

AP 1 sends a Trigger frame, sets the sending address of the Trigger frame to the MAC address of AP 1, and indicates, in the Trigger frame, several resource units for the random access of the unassociated station.

After receiving the Trigger frame, STA1 finds that the address carried by the sending address of the Trigger frame is the same as the MAC address (private identity) of the AP with which STA 1 intends to associate; and then STA 1 performs the random-access operation according to the resource units indicated by the Trigger frame and used for the random access of the unassociated station.

AP 2 sends a Trigger frame, sets the sending address of the Trigger frame to the MAC address of AP 2, and indicates, in the Trigger frame, several resource units for the random access of the unassociated station.

After receiving the Trigger frame, STA1 finds that the address carried by the sending address of the Trigger frame is the different from the MAC address (private identity) of the AP with which STA 1 is communicating; and then STA 1 cannot perform the random-access operation according to the resource units indicated by the Trigger frame and used for the random access of the unassociated stations. At this time, since the public identity is null, it is not feasible to perform the random-access operation no matter any other public identity is received.

If intending to communicate with AP 2 before association, STA 1 needs to complete the communication with AP 1, or needs to terminate the random-access operation based on AP 1, reset the contention-window parameter according to AP 2, and initialize the OBO-counter value.

Before performing the foregoing operations, STA 1 needs to know the random-access parameter of AP 1 and the random-access parameter of AP 2.

Figure 5:
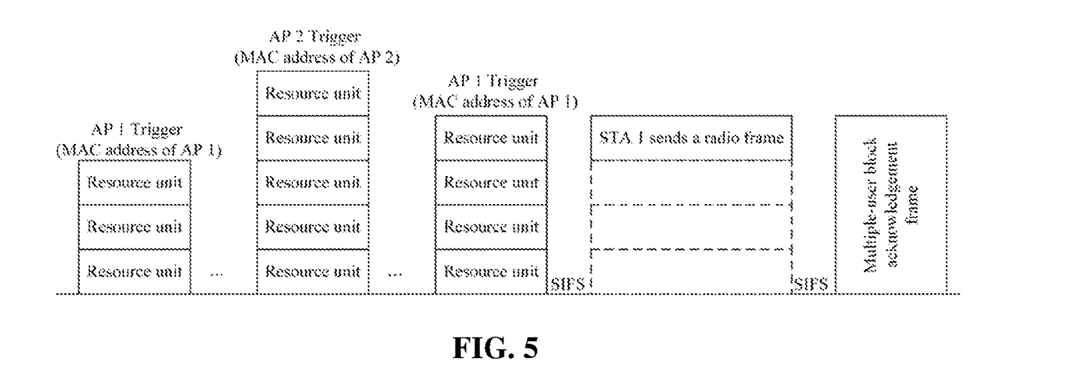
FIG. 5 is a schematic diagram of a random-access operation in the case where two access points that do not support Multiple BSSID exist around an unassociated station according to an embodiment of the present application.

As shown in FIG. 5, the AP sends a Trigger frame, sets the sending address of the Trigger frame to the MAC address of AP 1, and indicates, in the Trigger frame, 3 resource units for the random access of the unassociated station.

After receiving the Trigger frame, STA 1 finds that the address carried by the sending address of the Trigger frame is the same as the MAC address of the AP with which STA 1 intends to communicate; and then STA 1 sets the OFDMA contention window according to the parameter of AP 1, and initializes the OBO counter to an initial value of 6. Herein, the operation in which STA 1 sets the contention window and initializes the OBO-counter value may be after the action of receiving the Trigger frame from AP 1 or before the action of receiving the Trigger frame from AP 1.

After receiving the Trigger frame from AP 1, STA1 finds that 3 resource units are carried in the Trigger frame; and then the OBO counter of STA1 is set to 3 (the current value 6 minus the number 3 of resource units for the random access of the unassociated station). The OBO counter may be decremented by 1 as each resource unit for the random access of the unassociated stations is found; or after the total number of resource units for the random access of the unassociated stations is found, the OBO counter may be decremented by the total number at once. Which specific operation is to be adopted is not limited.

AP 2 sends a Trigger frame, sets the sending address of the Trigger frame to the MAC address of AP 2, and indicates, in the Trigger frame, 5 resource units for the random access of the unassociated station.

After receiving the Trigger frame from AP 2, STA1 finds that the address carried by the sending address of the Trigger frame is the different from the MAC address of the AP with which STA 1 intends to associate; and then STA 1 cannot perform the random-access operation according to the resource units indicated by the Trigger frame and used for the unassociated station.

AP 1 sends a Trigger frame, sets the sending address of the Trigger frame to the MAC address of AP 1, and indicates, in the Trigger frame, several resource units for the random access of the unassociated station.

After receiving the Trigger frame, STA 1 finds that the address carried by the sending address of the Trigger frame is the same as the MAC address of the AP with which STA 1 intends to communicate; and then the OBO counter of STA 1 is set to 0 (the current OBO-counter value is 3, which is less than the number 4 of resource units for the random-access operation of the unassociated station in the Trigger frame). In this case, STA 1 randomly selects one resource unit, from the 4 random-access resource units scheduled currently, to send data if other conditions are met.

In the foregoing operations, after receiving the Trigger frame from AP 2, STA 1 may terminate the random-access operation based on AP 1. Then STA1 sets the orthogonal frequency division multiple access (OFDMA) contention window according to the random-access parameter of AP 2, initializes the OBO counter, and performs the random-access operation based on AP 2.

In the foregoing operations, the random-access operation with AP 1 and the random-access operation with AP 2 may be performed simultaneously, but in this case, the random-access operations with different APs correspond to different contention windows and different OBO counters. After the random-access resource unit from a certain AP is received, the OBO counter corresponding to the certain AP is decremented. A corresponding radio frame is transmitted to the AP whose corresponding OBO counter is decremented to 0.

Embodiment Five

FIG. 4 is a schematic diagram illustrating the case of two access points (AP 1 and AP 2) existing around an unassociated station according to an embodiment of the present application. STA 1 intends to communicate with the two access points before association to, for example, learn about services (print, video download, etc.) supported by each access point, STA 1 positioning, association, etc.

Here, AP 1 has the capabilities to support Multiple BSSID, while AP 2 does not have the capabilities to support Multiple BSSID. AP 1 has the capabilities to support Multiple BSSID.

The number of BSSIDs supported by the AP is at most $2^n$, and n is a positive integer greater than or equal to 0. In this embodiment, the case where n=3 is taken as an example, and the AP can support at most 8 BSSIDs. Actually, the AP uses two of the BSSIDs to establish two BSSs (BSS 1 and BSS 2), respectively. The AP is to broadcast information, such as BSSIDs and SSIDs corresponding to the two BSSs, in the beacon frame or the probe response frame, and also notifies the foregoing value of n. The BSSID indicated by the sending address in the beacon frame or probe response frame carrying the foregoing information is called a transmitted BSSID. Other BSSIDs are called non-transmitted BSSIDs. AP 1 sets BSSID 1 as the transmit BSSID, that is, the public identity.

STA 1 finds, according to the beacon frame or the probe response frame sent by AP 1 or AP 2, that the public identity of AP 1 is BSSID 1 and the private identity of AP 1 is BSSID 2 (the BSSID of the BSS with which STA 1 intends to associate). AP 2 does not support Multiple BSSID. At this time, the public identity of AP 2 is null, and the private identity of AP 2 is the MAC address of the AP.

AP 1 sends a Trigger frame, sets the sending address of the Trigger frame as BSSID 1, and indicates, in the Trigger frame, several resource units for the random access of the unassociated station.

After receiving the Trigger frame, STA1 finds that the address carried by the sending address of the Trigger frame is the same as the public identity of the AP with which STA 1 intends to associate; and then STA 1 performs the random-access operation according to the resource units indicated by the Trigger frame and used for the random access of the unassociated station.

The AP sends a Trigger frame, sets the sending address of the Trigger frame to the MAC address of AP 2, and indicates, in the Trigger frame, several resource units for the random access of the unassociated station.

After receiving the Trigger frame, STA1 finds that the address carried by the sending address of the Trigger frame is the different from the MAC address of the AP with which STA 1 is communicating; and then STA 1 cannot perform the random-access operation according to the resource units indicated by the Trigger frame and used for the random access of the unassociated station.

If intending to communicate with AP 2 before association, STA 1 needs complete the communication with AP 1, or needs to terminate the random-access operation based on AP 1, reset the contention-window parameter according to AP 2, and initialize the OBO-counter value.

Before performing the foregoing operations, STA 1 needs to know the random-access parameter of AP 1 and the random-access parameter of AP 2.

Figure 6:
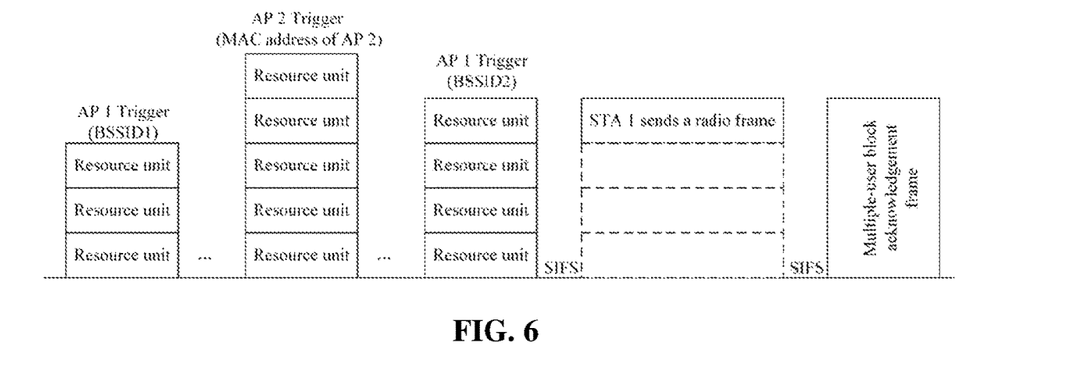
FIG. 6 is a schematic diagram of a random-access operation in the case where two access points exist around an unassociated station and one of the two access points supports Multiple BSSID according to an embodiment of the present application.

As shown in FIG. 6, the AP sends a Trigger frame, sets the sending address of the Trigger frame as the public identity of AP 1, and indicates, in the Trigger frame, 3 resource units for the random access of the unassociated station.

After receiving the Trigger frame, STA 1 finds that the address carried by the sending address of the Trigger frame is the same as the public identity of the AP with which STA 1 intends to communicate; and then STA 1 sets the orthogonal frequency division multiple access (OFDMA) contention window according to the parameter of AP 1, and initializes the OBO counter with an initial value of 6. Herein, the operation in which STA 1 sets the contention window and initializes the OBO-counter value may be after the action of receiving the Trigger frame from AP 1 or before the action of receiving the Trigger frame from AP 1.

After receiving the Trigger frame from AP 1, STA1 finds that 3 resource units are carried in the Trigger frame; and then the OBO counter of STA1 is set to 3 (the current value 6 minus the number 3 of resource units for the random access of the unassociated station). The OBO counter may be decremented by 1 as each resource unit for the random access of the unassociated stations is found; or after the total number of resource units for the random access of the unassociated stations is found, the OBO counter may be decremented by the total number at once. Which specific operation is to be adopted is not limited.

The AP sends a Trigger frame, sets the sending address of the Trigger frame to the MAC address of AP 2, and indicates, in the Trigger frame, 5 resource units for the random access of the unassociated station.

After receiving the Trigger frame from AP 2, STA1 finds that the address carried by the sending address of the Trigger frame is the different from the MAC address of the AP with which STA 1 intends to associate; and then STA 1 cannot perform the random-access operation according to the resource units indicated by the Trigger frame used for the unassociated stations.

AP 1 sends a Trigger frame, sets the sending address of the Trigger frame as BSSID 2 (private identity), and indicates, in the Trigger frame, 4 resource units for the random access of the unassociated station.

After receiving the Trigger frame, STA 1 finds that the address carried by the sending address of the Trigger frame is the same as the private identity with which STA 1 intends to communicate; and then the OBO counter of SAT 1 is set to 0 (the current OBO-counter value is 3, which is less than the number 4 of resource units for the random-access operation of the unassociated station in the Trigger frame). In this case, STA 1 randomly selects one resource unit from the 4 random-access resource units scheduled currently to send data if other conditions are met.

In the foregoing operations, after receiving the Trigger frame from AP 2, STA 1 may terminate the random-access operation based on AP 1. Then STA1 sets the orthogonal frequency division multiple access (OFDMA) contention window according to the random-access parameter of AP 2, initializes the orthogonal frequency division multiple access backoff counter, and performs the random-access operation based on AP 2.

Embodiment Six

Figure 7:
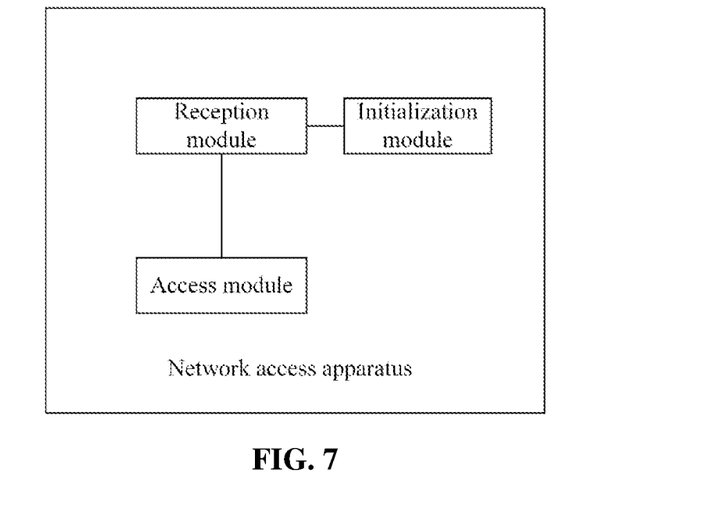
FIG. 7 is a schematic diagram of a network access apparatus according to an embodiment of the present application.

FIG. 7 is a schematic diagram of a network access apparatus according to an embodiment of the present application. As shown in FIG. 7, the apparatus includes a reception module and an access module.

The reception module is configured to receive the first radio frame from the first access point. The first radio frame indicates a resource unit for a random-access operation.

The access module is configured to perform the random-access operation when the sending address of the first radio frame is a public identity or a private identity.

In an embodiment, the reception module is further configured to receive the second radio frame sent by the first access point. The second radio frame carries information about a set of basic service sets supported by the first access point and/or a random-access parameter. The information about the set of basic service sets includes the public identity and the private identity.

In an embodiment, the apparatus further includes an initialization module.

The initialization module is configured to set a contention-window parameter according to the random-access parameter carried by the second radio frame, and initialize an orthogonal frequency division multiple access backoff (OBO) counter.

In an embodiment, when the apparatus is an unassociated station, the private identity is the identity of a basic service set, with which the station is to communicate, in the set of basic service sets; or when the station is an unassociated station, the public identity is the identity of a basic service set, with which all stations can communicate, in the set of basic service sets.

When the station is the unassociated station, the station performs the random-access operation only with the first access point in the process of performing the random-access operation, until the random access is completed.

In an embodiment, the public identity includes: the transmitted basic-service-set identity of the set of basic service sets, the media access control address of the first access point, or a value calculated through the media access control address of the first access point.

In an embodiment, the private identity is the identity of a basic service set, associated with the apparatus, in the set of basic service sets; or the public identity is the identity of a basic service set, with which all stations can communicate, in the set of basic service sets.

In an embodiment, the process in which the access module performs the random-access operation includes that: the orthogonal frequency division multiple access backoff (OBO) counter is decremented according to the number of resource units carried by the first radio frame; and when the OBO counter is decremented to 0 and the detection condition is met, one resource unit is selected, from the resource units carried by the first radio frame, for sending data.

In an embodiment, the apparatus further includes the process described below.

The initialization module receives the third radio frame from the second access point, resets the contention-window parameter according to the random-access parameter notified by the second access point, and reinitializes the orthogonal frequency division multiple access backoff (OBO) counter.

An embodiment of the present application further provides a network access apparatus including a memory and a processor.

The memory stores the following instructions: receiving the first radio frame from the first access point, where the first radio frame indicates a resource unit for a random-access operation; and when the sending address of the first radio frame is a public identity or a private identity, performing the random-access operation.

The processor is configured to execute the instructions stored in the memory.

An embodiment of the present application further provides a computer-readable storage medium storing computer-executable instructions. When the computer-executable instructions are executed, the network access method is performed.

It will be understood by those of ordinary skill in the art that all or part of the steps in the method described above may be implemented by related hardware instructed by one or more programs, and these programs may be stored in a computer-readable storage medium such as a ROM, a magnetic disk, an optical disk or the like. Optionally, all or some steps in the embodiments described above may also be implemented by using one or more integrated circuits. Each module/unit in the foregoing embodiments may be implemented by hardware or a software function module. The present application is not limited to any specific combination of hardware and software.

The above are only optional embodiments of the present application. The present application may have other various embodiments. Corresponding modifications and variations may be made by those skilled in the art according to the present application without departing from the spirit and essence of the present application. However, these corresponding modifications and variations fall within the scope of the claims in the present application.

INDUSTRIAL APPLICABILITY

According to the embodiments of the present application, a station receives the first radio frame from the first access point, where the first radio frame indicates a resource unit for a random-access operation; and when the sending address of the first radio frame is a public identity or a private identity, the station performs the random-access operation. In this way, the network collision can be reduced, and the transmission efficiency can be improved.

What is claimed is:

1. A network access method, comprising:
    performing, by a station, a first random-access based on a first radio frame received by the station from a first access point;
    receiving, by the station, a second radio frame from a second access point;
    resetting, by the station, a contention-window parameter according to a random-access parameter notified by the second access point;
    initializing, by the station, an orthogonal frequency division multiple access back-off counter; and
    performing a second random-access according to a parameter carried by the second radio frame, such that collisions occurring when stations perform random-access operations are prevented, and a network transmission efficiency is increased.

2. The network access method of claim 1, comprising:
    determining, by the station, whether the station is an unassociated station, wherein operation modes of unassociated stations are specified to prevent the collisions occurring when the unassociated station performs the random-access operations.

3. The network access method of claim 1, wherein the station is an unassociated station, the method comprising:
    receiving, by the station, a third radio frame from the second access point, wherein the third radio frame is a trigger frame comprising resource units for use in the random-access operations by the unassociated station.

4. The network access method of claim 3, comprising:
    determining, by the station, a sending address of the trigger frame indicative of a first identity or a second identity,
    wherein the first identity and the second identity correspond to a public identity and a private identity, wherein the second radio frame carries information about a set of basic service sets, and wherein:
        if the station is the unassociated station, the private identity is an identity of a basic service set, with which the station is to communicate, in the set of basic service sets; or
        if the station is the unassociated station, the public identity is an identity of the basic service set, with which all stations are configured to communicate, in the set of basic service sets.

5. The network access method of claim 4, wherein the public identity comprises:
    a transmitted basic-service-set identity of the set of basic service sets, a media access control address of the second access point, or a value calculated from the media access control address of the second access point.

6. The network access method of claim 1, wherein:
    if the station is an unassociated station, the station performs the random-access operations only with the second access point until the second random-access is completed.

7. The network access method of claim 1, wherein performing the random-access operations comprises:
    decrementing, by the station, the orthogonal frequency division multiple access back-off counter according to a number of resource units; and
    in response to determining that the orthogonal frequency division multiple access back-off counter is decremented to 0 and a detection condition is met, selecting, by the station from the resource units, one resource unit to send data.

8. A station for network access comprising a non-transitory storage medium, storing computer-executable instructions, wherein, when executed on the station, the computer-executable instructions configure the station to:
    perform a first random-access based on a first radio frame received by the station from a first access point;
    receive a second radio frame from a second access point;
    reset a contention-window parameter according to a random-access parameter notified by the second access point;
    initialize an orthogonal frequency division multiple access back-off counter; and
    perform a second random-access according to a parameter carried by the second radio frame, such that collisions occurring when stations perform random-access operations are prevented, and a network transmission efficiency is increased.

9. The station of claim 8, wherein the instructions configure the station to:
    determine whether the station is an unassociated station, wherein operation modes of unassociated stations are specified to prevent the collisions occurring when the unassociated station performs the random-access operations.

10. The station of claim 8, wherein the station is an unassociated station, and wherein the instructions configure the station to:
   receive a third radio frame from the second access point, wherein the third radio frame is a trigger frame comprising resource units for use in the random-access operations by the unassociated station.

11. The station of claim 10, wherein the instructions configure the station to:
   determine a sending address of the trigger frame indicative of a first identity or a second identity,
   wherein the first identity and the second identity correspond to a public identity and a private identity, wherein the second radio frame carries information about a set of basic service sets, and wherein:
      if the station is the unassociated station, the private identity is an identity of a basic service set, with which the station is to communicate, in the set of basic service sets; or
      if the station is the unassociated station, the public identity is an identity of the basic service set, with which all stations are configured to communicate, in the set of basic service sets.

12. The station of claim 11, wherein the public identity comprises:
   a transmitted basic-service-set identity of the set of basic service sets, a media access control address of the second access point, or a value calculated from the media access control address of the second access point.

13. The station of claim 8, wherein:
   if the station is an unassociated station, the station performs the random-access operations only with the second access point until the second random-access is completed.

14. The station of claim 8, wherein the instructions to perform the random-access configure the station to:
   decrement the orthogonal frequency division multiple access back-off counter according to a number of resource units; and
   in response to determining that the orthogonal frequency division multiple access back-off counter is decremented to 0 and a detection condition is met, select from the resource units, one resource unit to send data.

15. A network access apparatus, comprising a memory and at least one processor, wherein the memory stores instructions, which when executed on the network access apparatus, configure the network access apparatus to:
   perform a first random-access based on a first radio frame received by the network access apparatus from a first access point;
   receive a second radio frame from a second access point;
   reset a contention-window parameter according to a random-access parameter notified by the second access point;
   initialize an orthogonal frequency division multiple access back-off counter; and
   perform a second random-access according to a parameter carried by the second radio frame, such that collisions occurring when stations perform random-access operations are prevented, and a network transmission efficiency is increased.

16. The network access apparatus of claim 15, wherein the instructions configure the network access apparatus to:
   determine whether the network access apparatus is an unassociated station, wherein operation modes of unassociated stations are specified to prevent the collisions occurring when the unassociated station performs the random-access operations.

17. The network access apparatus of claim 15, wherein the network access apparatus is an unassociated station, and wherein the instructions configure the network access apparatus to:
   receive a third radio frame from the second access point, wherein the third radio frame is a trigger frame comprising resource units for use in the random-access operations by the unassociated station.

18. The network access apparatus of claim 17, wherein the instructions configure the network access apparatus to:
   determine a sending address of the trigger frame indicative of a first identity or a second identity,
   wherein the first identity and the second identity correspond to a public identity and a private identity, wherein the second radio frame carries information about a set of basic service sets, and wherein:
      if the network access apparatus is the unassociated station, the private identity is an identity of a basic service set, with which the network access apparatus is to communicate, in the set of basic service sets; or
      if the network access apparatus is the unassociated station, the public identity is an identity of the basic service set, with which all stations are configured to communicate, in the set of basic service sets.

19. The network access apparatus of claim 18, wherein the public identity comprises:
   a transmitted basic-service-set identity of the set of basic service sets, a media access control address of the second access point, or a value calculated from the media access control address of the second access point.

20. The network access apparatus of claim 15, wherein:
   if the network access apparatus is an unassociated station, the network access apparatus performs the random-access operations only with the second access point until the second random-access is completed.

* * * * *